United States Patent
Ohsawa et al.

(10) Patent No.: US 9,936,182 B2
(45) Date of Patent: Apr. 3, 2018

(54) IMAGE GENERATION APPARATUS, EVALUATION SYSTEM, AND NON-TRANSITORY COMPUTER READABLE MEDIUM

(71) Applicant: FUJI XEROX CO., LTD., Tokyo (JP)

(72) Inventors: Chizuru Ohsawa, Kanagawa (JP); Toshihiro Iwafuchi, Kanagawa (JP); Noriko Sakai, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/885,498

(22) Filed: Oct. 16, 2015

(65) Prior Publication Data
US 2016/0309129 A1     Oct. 20, 2016

(30) Foreign Application Priority Data
Apr. 14, 2015   (JP) ................... 2015-082767

(51) Int. Cl.
*H04N 9/31*     (2006.01)
*H04N 17/02*    (2006.01)

(52) U.S. Cl.
CPC ......... *H04N 9/3191* (2013.01); *H04N 9/3182* (2013.01); *H04N 17/02* (2013.01)

(58) Field of Classification Search
CPC ....... H04N 9/3191; H04N 17/00; H04N 17/02
See application file for complete search history.

(56) References Cited

U.S. PATENT DOCUMENTS

| | | | | |
|---|---|---|---|---|
| 6,498,660 B2 * | 12/2002 | Haltmaier | ............... | G06K 9/38 358/2.1 |
| 6,686,953 B1 * | 2/2004 | Holmes | ............... | H04N 1/6033 348/179 |
| 6,953,250 B2 * | 10/2005 | Yasumi | ............... | H04N 5/74 345/593 |
| 6,954,216 B1 * | 10/2005 | Dowling | ............... | G09G 3/2003 345/593 |

(Continued)

FOREIGN PATENT DOCUMENTS

CN     1604632 A     4/2005

OTHER PUBLICATIONS

Aug. 21, 2017 Office Action issued in Chinese Patent Application No. 201510870737.3.

*Primary Examiner* — Brian Yenke
(74) *Attorney, Agent, or Firm* — Oliff PLC

(57) ABSTRACT

An image generation apparatus includes an image-data generation unit, an image-data output unit, and a retaining unit. The image-data generation unit generates image data of an evaluation image having a first reference color, a second reference color, a first evaluation color, and a second evaluation color, the first and second reference colors being paired in a predetermined color space, the first and second evaluation colors being different colors between the first and second reference colors in the predetermined color space. The image-data output unit outputs the image data to a display device. The retaining unit retains image data of the first and second evaluation colors obtained when an image having the first evaluation color looks the same as an image having the second evaluation color in terms of brightness or tint in a case where the evaluation image is displayed on the display device.

4 Claims, 14 Drawing Sheets

(56) References Cited

U.S. PATENT DOCUMENTS

| | | | | |
|---|---|---|---|---|
| 7,489,337 B2* | 2/2009 | Houmeau | ................ | H04N 9/12 345/1.3 |
| 8,797,411 B2* | 8/2014 | Corley | ................. | G01J 3/0262 348/175 |
| 8,866,838 B2* | 10/2014 | Marcu | ................. | G09G 3/2003 345/590 |
| 8,870,393 B2* | 10/2014 | Kawahara | ............ | H04N 9/3182 345/589 |
| 9,224,342 B2* | 12/2015 | Lin | ........................ | G09G 3/344 |
| 9,257,093 B2* | 2/2016 | Sakakibara | ............ | G09G 3/002 |
| 2004/0212783 A1* | 10/2004 | Wada | ...................... | H04N 9/73 353/31 |
| 2005/0094110 A1* | 5/2005 | Nakamura | ............... | H04N 5/74 353/85 |
| 2005/0219467 A1* | 10/2005 | Nomizo | ................ | G03B 21/26 353/30 |
| 2005/0270499 A1* | 12/2005 | Ishii | ...................... | G03B 21/14 353/94 |
| 2011/0032363 A1* | 2/2011 | Pines | .................... | G03B 21/00 348/177 |
| 2014/0176730 A1* | 6/2014 | Kaji | .................... | H04N 9/3185 348/189 |
| 2014/0354674 A1* | 12/2014 | Okamoto | ................ | G09G 5/02 345/590 |
| 2015/0077573 A1* | 3/2015 | Ishikawa | ................ | G06T 3/005 348/189 |
| 2015/0304617 A1* | 10/2015 | Chang | ................. | H04N 9/3185 348/189 |
| 2016/0006998 A1* | 1/2016 | Lee | ..................... | H04N 9/3182 348/189 |
| 2016/0189672 A1* | 6/2016 | Demos | ................... | G09G 5/02 345/589 |

* cited by examiner

FIG. 3A
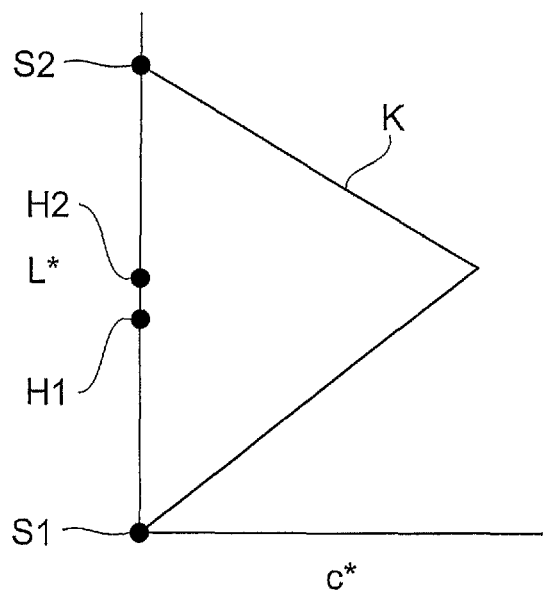
FIG. 3B
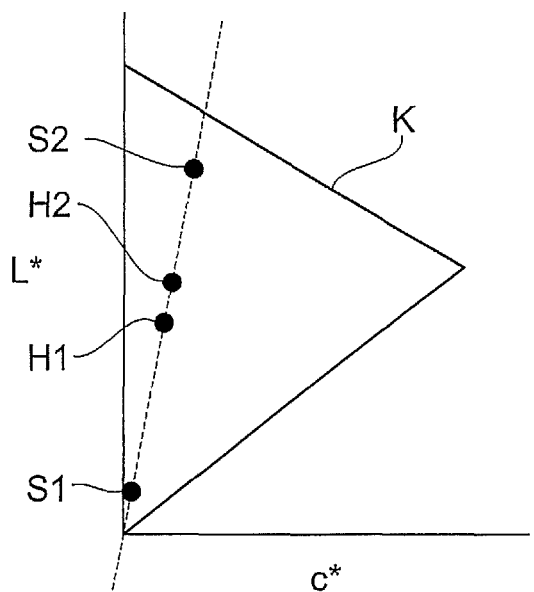
FIG. 3C
R/G/B
| S1 | S2 | H1 | H2 |
|---|---|---|---|
| 0/0/0 | 255/255/255 | 32/32/32 | 64/64/64 |
| 10/10/10 | 248/248/248 | 160/160/160 | 180/180/180 |
| 0/0/10 | 245/245/255 | 10/10/20 | 20/20/30 |

FIG. 4A
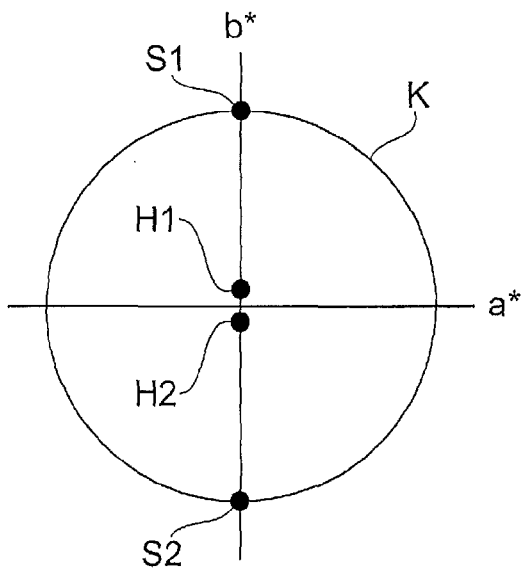
FIG. 4B
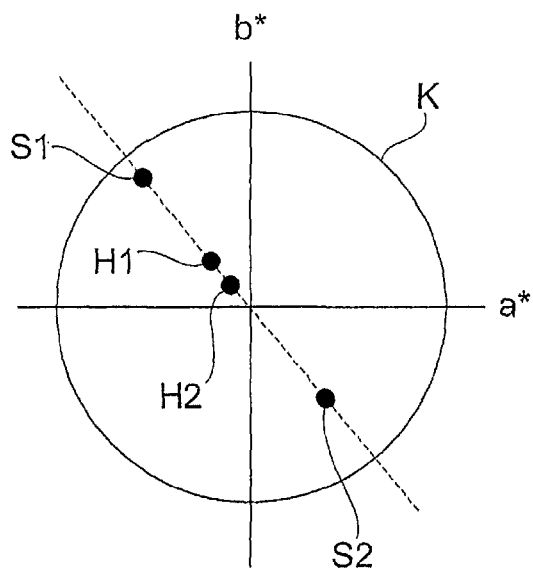
FIG. 4C
R/G/B
| S1 | S2 | H1 | H2 |
|---|---|---|---|
| 255/255/0 | 0/0/255 | 128/128/128 | 125/125/130 |
| 248/248/0 | 0/0/200 | 128/128/128 | 135/135/120 |
| 0/128/255 | 255/128/0 | 128/128/128 | 123/128/132 |

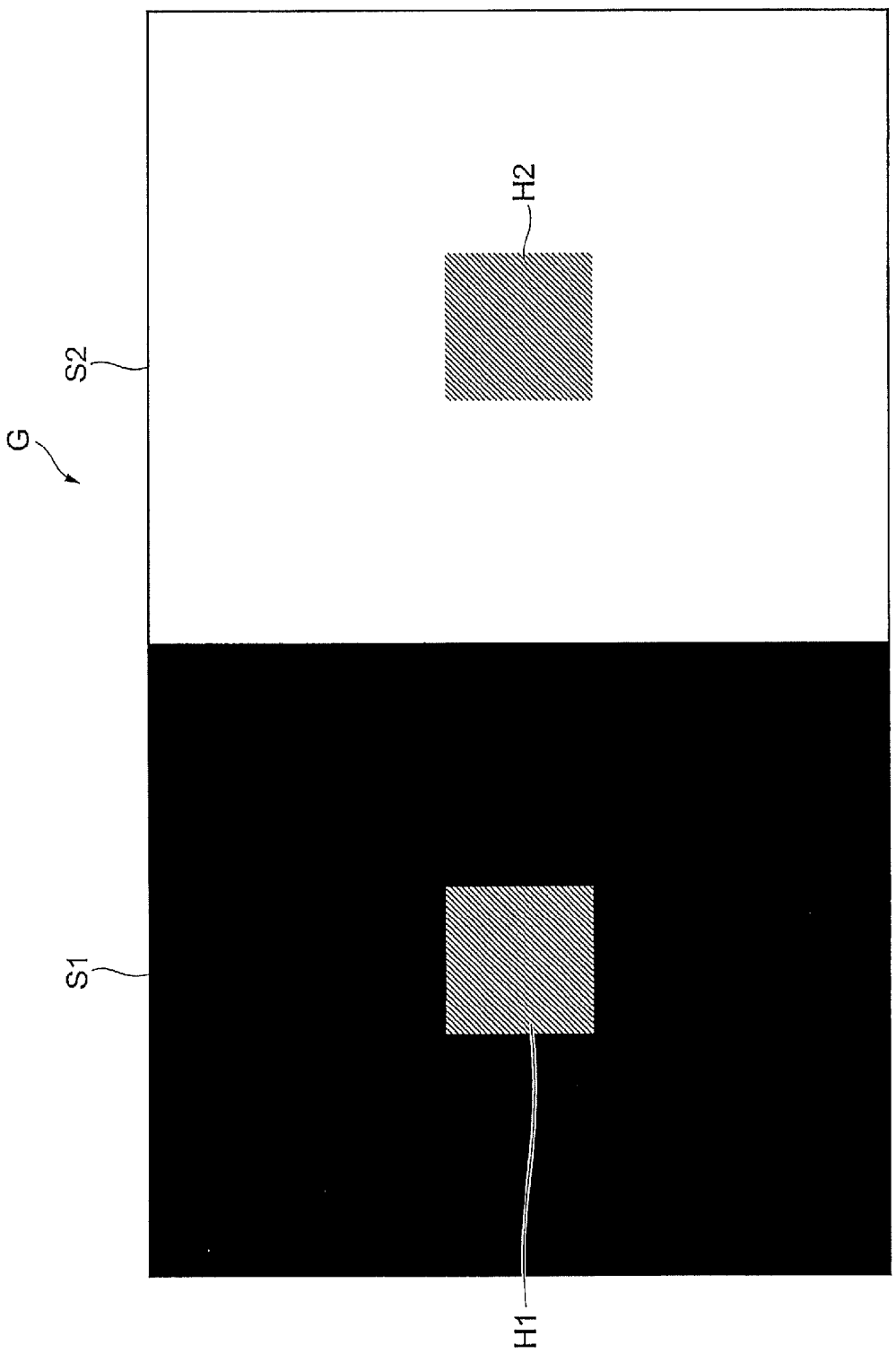

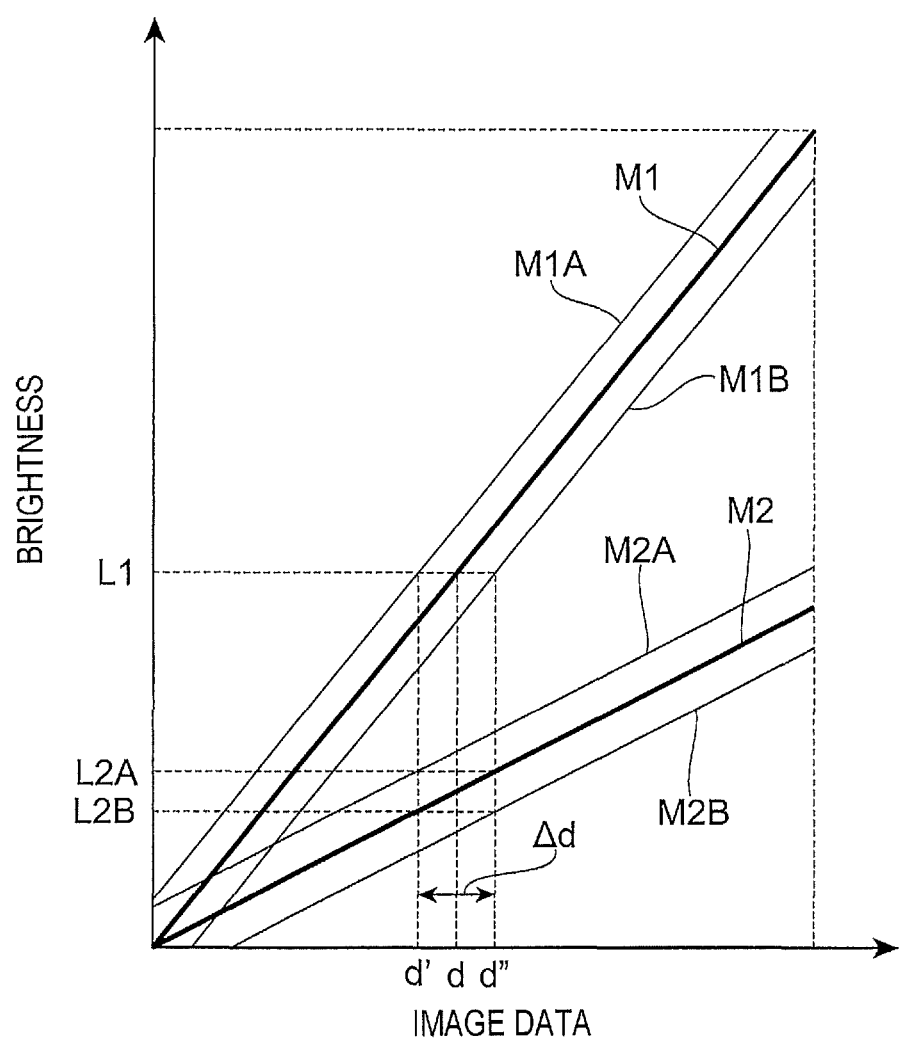

FIG. 7

| INPUT VALUE | OUTPUT VALUE |
|---|---|
| 0 | 0 |
| 1 | 2 |
| ⋮ | ⋮ |
| 62 | 75 |
| 63 | 76 |
| ⋮ | ⋮ |
| 255 | 255 |

IMAGE GENERATION APPARATUS, EVALUATION SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-082767 filed Apr. 14, 2015.

BACKGROUND

Technical Field

The present invention relates to an image generation apparatus, an evaluation system, and a non-transitory computer readable medium.

SUMMARY

According to an aspect of the invention, there is provided an image generation apparatus including an image-data generation unit, an image-data output unit, and a retaining unit. The image-data generation unit generates image data of an evaluation image having a first reference color, a second reference color, a first evaluation color, and a second evaluation color, the first reference color and the second reference color being determined using a relationship in which the first reference color and the second reference color are paired in a predetermined color space, the first evaluation color and the second evaluation color being colors between the first reference color and the second reference color in the predetermined color space, the first evaluation color being determined with respect to the first reference color, the second evaluation color being determined with respect to the second reference color and being different from the first evaluation color. The image-data output unit outputs the image data to a display device that is caused to display the evaluation image. The retaining unit retains image data of the first evaluation color and image data of the second evaluation color obtained when an image having the first evaluation color looks the same as an image having the second evaluation color in terms of brightness or tint in a case where the evaluation image is displayed on the display device.

BRIEF DESCRIPTION OF THE DRAWINGS

An exemplary embodiment of the present invention will be described in detail based on the following figures, wherein:

FIGS. 3A to 3C are diagrams illustrating a method for determining a first reference color, a second reference color, a first evaluation color, and a second evaluation color;

FIGS. 4A to 4C are diagrams illustrating another method for determining the first reference color, the second reference color, the first evaluation color, and the second evaluation color;

FIG. 5 is a diagram illustrating a first example of an evaluation image displayed by a projector;

FIG. 6 is a diagram used to describe image data of a first evaluation color and image data of a second evaluation color retained in a retaining unit;

FIG. 7 is a diagram illustrating a one-dimensional LUT generated by a conversion-relationship generation unit;

DETAILED DESCRIPTION

<Description of Entire Configuration of Evaluation System>

In the following, an exemplary embodiment of the invention will be described in detail with reference to the attached drawings.

Figure 1:
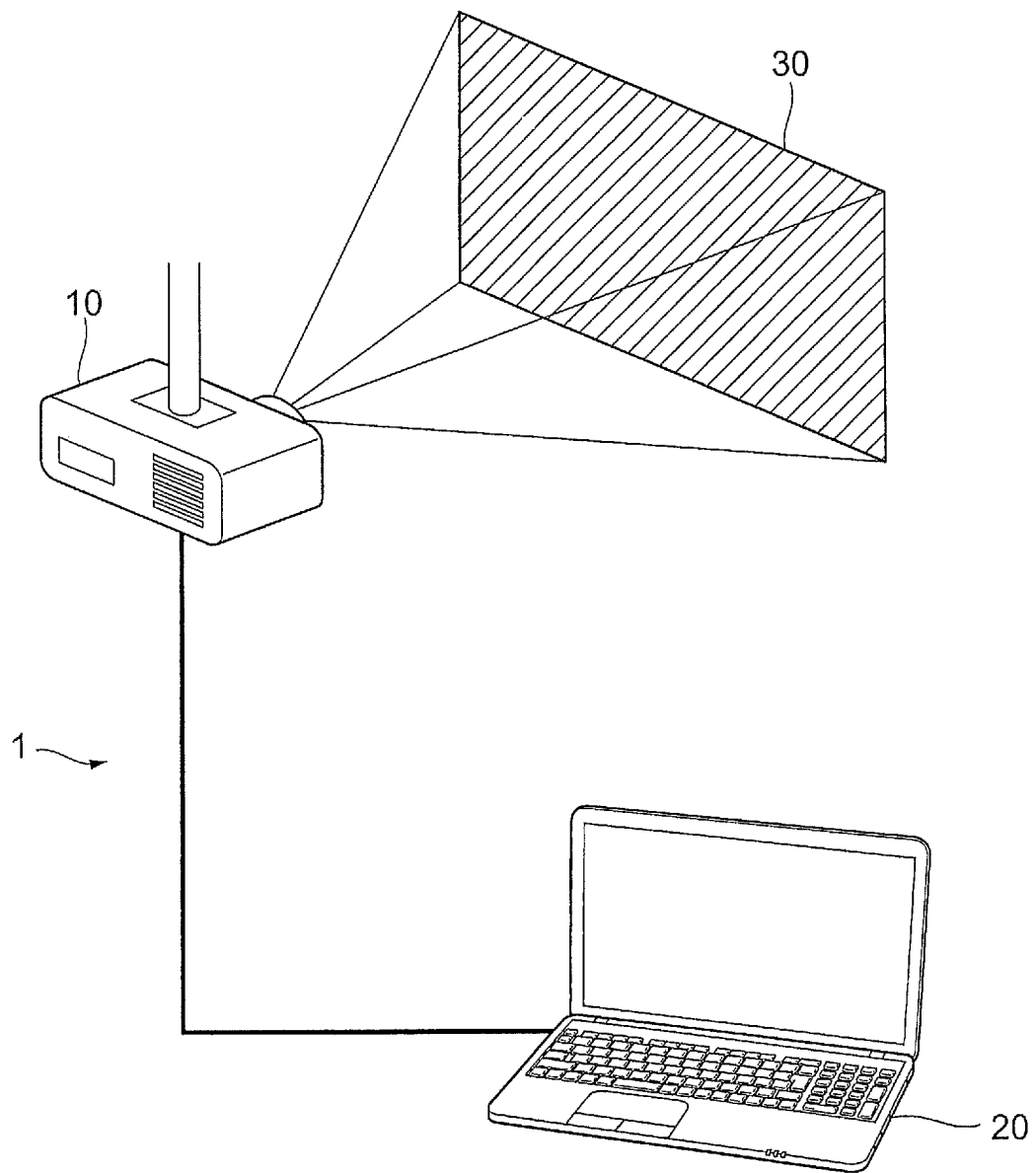
FIG. 1 is a diagram illustrating an example of the configuration of an evaluation system according to a present exemplary embodiment.

FIG. 1 is a diagram illustrating an example of the configuration of an evaluation system 1 according to a present exemplary embodiment.

The evaluation system 1, which is illustrated, includes a projector 10 and an image generation apparatus 20. In addition, a screen 30 is also illustrated in FIG. 1 although the screen 30 is not included in the evaluation system 1.

The projector 10 is an example of a display device, and has the function of causing images to be displayed on the screen 30. The projector 10 includes, for example, a lamp serving as a light source, a liquid crystal panel that displays images based on image data, and an optical system that enlarges images on the liquid crystal panel. In this case, the liquid crystal panel is irradiated with light emitted from the lamp, and the light is allowed to pass through the liquid crystal panel. Then, images displayed on the liquid crystal panel are enlarged by the optical system, and the enlarged images are projected onto the screen 30. As a result, the images displayed on the liquid crystal panel are enlarged and projected, and then are displayed on the screen 30.

The image generation apparatus 20 is, for example, a general-purpose personal computer (PC). The image generation apparatus 20 generates image data of an evaluation image by causing various application software programs to operate under the control of an operating system (OS), and outputs the image data to the projector 10. Then, the projector 10 causes the evaluation image to be displayed on the screen 30. The details of the evaluation image will be described later.

The projector 10 and the image generation apparatus 20 are connected to each other by using a method with which image data may be output from the image generation apparatus 20 to the projector 10. Specifically, examples of such a method include composite connection, S-terminal connection, D-terminal connection, Video Graphics Array (VGA) connection, Digital Visual Interface (DVI) connection, High-Definition Multimedia Interface (HDMI®) connection, Display Port connection, and Universal Serial Bus (USB) connection.

<Description of Image Generation Apparatus 20>

Next, the image generation apparatus 20 will be described in greater detail.

Figure 2:
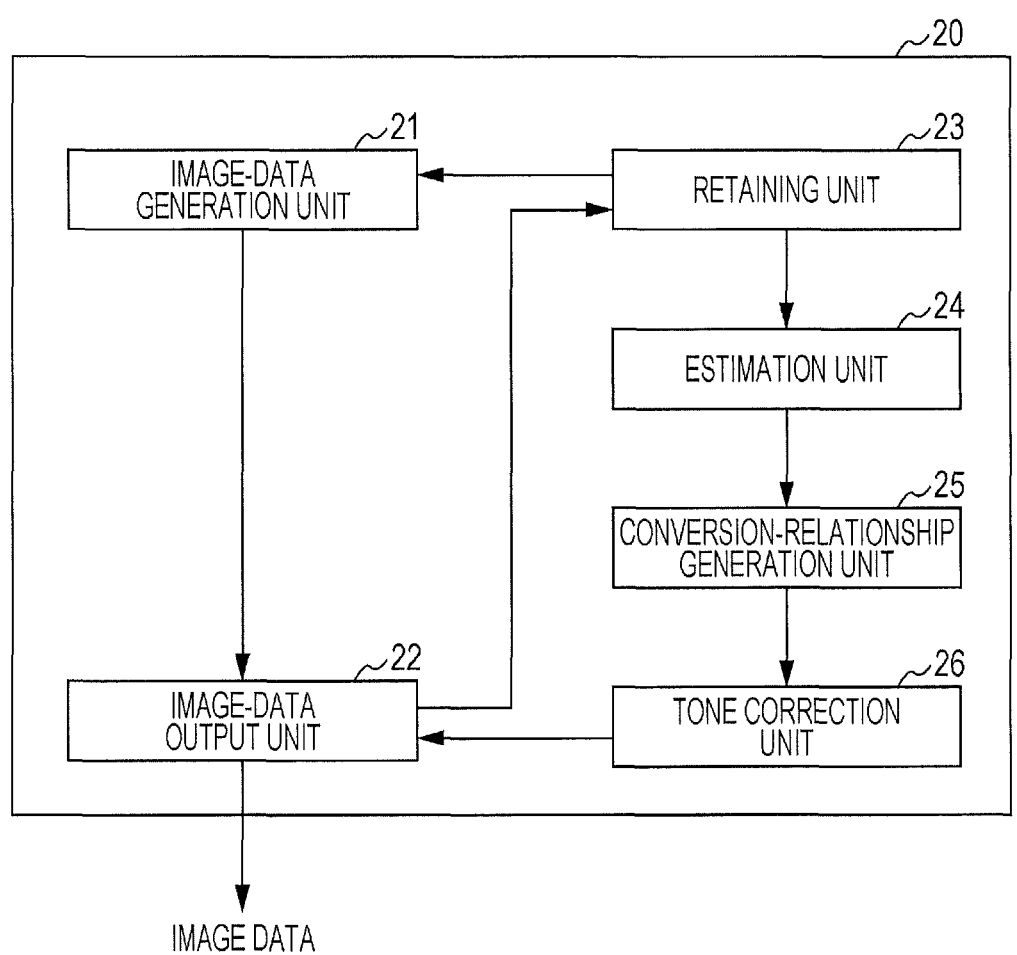
FIG. 2 is a block diagram illustrating an example of a functional configuration of an image generation apparatus.

FIG. 2 is a block diagram illustrating an example of a functional configuration of the image generation apparatus 20.

Note that, here, only the functions related to the present exemplary embodiment are illustrated among various functions of the image generation apparatus 20.

As illustrated in FIG. 2, the image generation apparatus 20 includes an image-data generation unit 21, an image-data output unit 22, a retaining unit 23, an estimation unit 24, a conversion-relationship generation unit 25, and a tone correction unit 26. The image-data generation unit 21 generates image data of an evaluation image. The image-data output unit 22 outputs the image data to the projector 10. The retaining unit 23 retains the image data of the evaluation image. The estimation unit 24 estimates the degree of reduction in the brightness of the lamp. The conversion-relationship generation unit 25 generates a conversion relationship used to correct tone characteristics. The tone correction unit 26 corrects tone characteristics of the image data to be output by the image-data output unit 22.

The image-data generation unit 21 generates image data used to display an evaluation image having the following structure.

An evaluation image according to the present exemplary embodiment is an image having a first reference color S1, a second reference color S2, a first evaluation color H1, and a second evaluation color H2.

FIGS. 3A to 3C are diagrams illustrating a method for determining the first reference color S1, the second reference color S2, the first evaluation color H1, and the second evaluation color H2.

First, the first reference color S1 and the second reference color S2 are determined using a relationship in which the first reference color S1 and the second reference color S2 are paired in a predetermined color space. Here, for example, the L*a*b* color space is used as the predetermined color space. The color gamut of the projector 10 is denoted by K in this color space.

FIG. 3A illustrates a first example in which the first reference color S1, the second reference color S2, the first evaluation color H1, and the second evaluation color H2 are determined in the L*a*b* color space.

In this case, the first reference color S1 is (L*, a*, b*)=(0, 0, 0), and is black. The second reference color S2 is (L*, a*, b*)=(100, 0, 0), and is white. The first evaluation color H1 is determined with respect to the first reference color S1, and is determined so as to be a color between the first reference color S1 and the second reference color S2 in this color space. Furthermore, the second evaluation color H2 is determined with respect to the second reference color S2, and is determined so as to be a color between the first reference color S1 and the second reference color S2 in this color space. That is, when the first reference color S1 is joined to the second reference color S2 using a straight line in this color space, the first evaluation color H1 and the second evaluation color H2 are positioned on this straight line. Note that the first evaluation color H1 and the second evaluation color H2 do not have to be positioned precisely on this straight line, and may be slightly shifted from this straight line. Thus, here, the case where the first evaluation color H1 and the second evaluation color H2 are positioned on the straight line refers to the case where the first evaluation color H1 and the second evaluation color H2 are positioned on the straight line or slightly shifted from the straight line. Note that the first evaluation color H1 and the second evaluation color H2 are determined to be different colors. In this case, the first evaluation color H1 and the second evaluation color H2 are gray, and the brightness of the second evaluation color H2 is higher than the brightness of the first evaluation color H1.

In addition, it is preferable that the first reference color S1 and the second reference color S2 be determined to be colors near the outer edge of the color gamut K; however, the first reference color S1 and the second reference color S2 do not have to be determined to be colors on the outermost edge as illustrated in FIG. 3A.

FIG. 3B illustrates a second example in which the first reference color S1, the second reference color S2, the first evaluation color H1, and the second evaluation color H2 are determined in the L*a*b* color space.

In this case, the first reference color S1 and the second reference color S2 are determined to be colors near the outer edge of the color gamut K but are not colors on the outermost edge. Similarly to as in FIG. 3A, the first evaluation color H1 is determined with respect to the first reference color S1, and is determined so as to be a color between the first reference color S1 and the second reference color S2 in this color space. Then, the second evaluation color H2 is determined with respect to the second reference color S2, and is determined so as to be a color between the first reference color S1 and the second reference color S2 in this color space.

FIG. 3C illustrates an example in which the first reference color S1, the second reference color S2, the first evaluation color H1, and the second evaluation color H2 are converted into image data. Image data is RGB data, RGB being R (red), G (green), and B (blue). Here, each of R, G, and B of the image data is represented by 8 bits (256 tones from 0 to 255). For example, when image data is (R, G, B)=(0, 0, 0), the image data is image data used to display a black image, and corresponds to the first reference color S1 described using FIG. 3A. When image data is (R, G, B)=(255, 255, 255), the image data is image data used to display a white image, and corresponds to the second reference color S2 described using FIG. 3A. When R=G=B and each of R, G, and B is a value among 1 to 254, the image data is image data used to display a gray image. In this case, the image data corresponds to the first evaluation color H1 or the second evaluation color H2 described using FIG. 3A.

The method described using FIGS. 3A to 3C and in which the first reference color S1, the second reference color S2, the first evaluation color H1, and the second evaluation color H2 are determined is a method in which the first reference color S1, the second reference color S2, the first evaluation color H1, and the second evaluation color H2 are each determined by changing brightness (L*). However the method is not limited to this method.

FIGS. 4A to 4C are diagrams illustrating another method for determining the first reference color S1, the second reference color S2, the first evaluation color H1, and the second evaluation color H2.

FIG. 4A illustrates a third example in which the first reference color S1, the second reference color S2, the first evaluation color H1, and the second evaluation color H2 are determined in the L*a*b* color space.

In this case, the first reference color S1 and the second reference color S2 are determined by changing the hue (a*, b*). Here, the first reference color S1 has the same brightness (L*) as the second reference color S2. In addition, the first reference color S1 is (a*, b*)=(0, b*max (the maximum value for b* at this L*)), and the second reference color S2 is (a*, b*)=(0, b*min (the minimum value for b* at this L*)). Then, the first evaluation color H1 and the second evaluation color H2 are determined by using the same method as the one described above.

FIG. 4B illustrates a fourth example in which the first reference color S1, the second reference color S2, the first evaluation color H1, and the second evaluation color H2 are determined in the L*a*b* color space.

In this case, too, the first reference color S1 and the second reference color S2 are determined by changing the hue (a*, b*). The first reference color S1 and the second reference color S2 are determined to be colors near the outer edge of the color gamut K but are not colors on the outermost edge. Then, the first evaluation color H1 and the second evaluation color H2 are determined by using the same method as the one described above.

FIG. 4C illustrates an example in which the first reference color S1, the second reference color S2, the first evaluation color H1, and the second evaluation color H2 are converted into image data. Here, image data is illustrated that is obtained in the case where the first reference color S1 and the second reference color S2 are determined by changing the hue (a*, b*) with respect to FIG. 3C. In this case, for example, when image data is (R, G, B)=(0, 0, 255), the image data is image data used to display a blue image. When image data is (R, G, B)=(255, 255, 0), the image data is image data used to display a yellow image.

Returning back to FIG. 2, the image-data output unit 22 outputs the image data of the evaluation image to the projector 10. The evaluation image is then displayed on the screen 30.

FIG. 5 is a diagram illustrating a first example of the evaluation image displayed by the projector 10.

An evaluation image G, which is illustrated, includes an image having the first reference color S1 and the first evaluation color H1 on the left side of FIG. 5 (hereinafter also referred to as an "image A") and an image having the second reference color S2 and the second evaluation color H2 on the right side of FIG. 5 (hereinafter also referred to as an "image B"). In addition, in the image A, an image having the first evaluation color H1 is arranged such that the image having the first evaluation color H1 is surrounded by and is in contact with an image having the first reference color S1. Furthermore, in the image B, an image having the second evaluation color H2 is arranged such that the image having the second evaluation color H2 is surrounded by and is in contact with an image having the second reference color S2.

Note that, in this case, the first reference color S1, the second reference color S2, the first evaluation color H1, and the second evaluation color H2 are the colors described using FIG. 3A. That is, the first reference color S1 is black, and the second reference color S2 is white. The first evaluation color H1 and the second evaluation color H2 are gray, and the brightness of the second evaluation color H2 is higher than the brightness of the first evaluation color H1. Note that, here, all of these images have rectangular shapes.

Here, a user compares the image having the first evaluation color H1 with the image having the second evaluation color H2, and evaluates which one of the images looks brighter. Then, the user changes the brightness of the image having the first evaluation color H1 and the brightness of the image having the second evaluation color H2 by changing image data of the image having the first evaluation color H1 and image data of the image having the second evaluation color H2, and searches for the case where the brightness of the image having the first evaluation color H1 looks the same as the brightness of the image having the second evaluation color H2. In this case, the image data of the first evaluation color H1 and the image data of the second evaluation color H2 change on the straight line joining the first reference color S1 to the second reference color S2 in the L*a*b* color space. The image-data generation unit 21 sets the first evaluation color H1 and the second evaluation color H2 on the straight line.

When the brightness of the image having the first evaluation color H1 looks the same as the brightness of the image having the second evaluation color H2, the brightness of the image having the second evaluation color H2 is actually higher than the brightness of the image having the first evaluation color H1 because of recognition characteristics of the human eye. That is, when the brightness of the image having the first evaluation color H1 is the same as the brightness of the image having the second evaluation color H2, the image having the first evaluation color H1 surrounded by the first reference color S1, black, looks brighter than the image having the second evaluation color H2 surrounded by the second reference color S2, white, to the human eye. Thus, in order to cause both the images to look the same in terms of brightness, the brightness of the image having the second evaluation color H2 needs to be higher than the brightness of the image having the first evaluation color H1.

The retaining unit 23 retains the image data of the first evaluation color H1 and the image data of the second evaluation color H2 obtained when the brightness of the image having the first evaluation color H1 looks the same as the brightness of the image having the second evaluation color H2.

FIG. 6 is a diagram used to describe the image data of the first evaluation color H1 and the image data of the second evaluation color H2 retained in the retaining unit 23.

In FIG. 6, the horizontal axis represents input values of image data, and the vertical axis represents brightness. Here, the case is illustrated where when image data increases, the brightness linearly increases.

Here, a bold line M1 represents the relationship between image data and brightness obtained when the lamp is not deteriorated. In this case, the brightness of the first evaluation color H1 looks higher than its actual brightness. For the first evaluation color H1, the relationship between image data and brightness is thus illustrated as a fine line M1A. The brightness of the second evaluation color H2 looks lower than its actual brightness. For the second evaluation color H2, the relationship between image data and brightness is thus illustrated as a fine line M1B. In the case where the brightness of the first evaluation color H1 looks the same (brightness L1) as the brightness of the second evaluation color H2, the image data for the first evaluation color H1 is denoted by d', and the image data for the second evaluation color H2 is denoted by d". That is, the image data d' is the image data of the first evaluation color H1 retained in the retaining unit 23, and the image data d" is the image data of the second evaluation color H2 retained in the retaining unit 23.

Here suppose the case where the lamp is deteriorated and its brightness is reduced by using the projector 10.

In this case, when the evaluation image G illustrated in FIG. 5 is displayed using the projector 10, the image having the first evaluation color H1 looks brighter than the image having the second evaluation color H2.

In FIG. 6, a bold line M2 represents the relationship between image data and brightness obtained when the lamp is deteriorated. In this case, the brightness of the first evaluation color H1 looks higher than its actual brightness. For the first evaluation color H1, the relationship between image data and brightness is thus illustrated as a fine line M2A. The brightness of the second evaluation color H2 looks lower than its actual brightness. For the second evaluation color H2, the relationship between image data and brightness is thus illustrated as a fine line M2B. Here, in the case where the image having the first evaluation color H1 is displayed using the image data d', the brightness becomes L2A. In contrast, in the case where the image having the second evaluation color H2 is displayed using the image data d", the brightness becomes L2B. In this case, L2A>L2B, and the image having the first evaluation color H1 looks brighter than the image having the second evaluation color H2.

Thus, the user may determine the degree of deterioration of the lamp from the difference in brightness, and may determine when the lamp needs to be replaced.

Note that, in the present exemplary embodiment, the image generation apparatus 20 determines the degree of deterioration of the lamp as described in the following.

When the brightness of the image having the first evaluation color H1 looks different from the brightness of the image having the second evaluation color H2 because of deterioration of the lamp, a search for the first evaluation color H1 and the second evaluation color H2 obtained when the brightness of the image having the first evaluation color H1 looks the same as the brightness of the image having the second evaluation color H2 is performed again. The image-data generation unit 21 sets the first evaluation color H1 and the second evaluation color H2 on the straight line joining the first reference color S1 to the second reference color S2 in the L*a*b* color space. Then, image data of the evaluation image G having the first evaluation color H1 and the second evaluation color H2 is generated again.

The estimation unit 24 estimates the degree of reduction in the brightness of the lamp in accordance with the image data generated again.

The greater the deterioration of the lamp, the greater the difference between the first evaluation color H1 and the second evaluation color H2 in the image data generated again. That is, the more the lamp is deteriorated, the greater the difference between the image data d' of the first evaluation color H1 and the image data d" of the second evaluation color H2. Thus, the estimation unit 24 may estimate the degree of deterioration of the lamp in accordance with the difference between the image data d' and the image data d" (Δd=d"−d'). For example, a threshold is set for Δd, and in the case where the difference exceeds this threshold, the estimation unit 24 determines that the lamp needs to be replaced. In this case, a warning may also be issued to the user.

In this manner, the estimation unit 24 estimates a change in the brightness of the projector 10 from the image data of the first evaluation color H1 and the image data of the second evaluation color H2 in the evaluation image G generated again.

Note that, for example, contrast is reduced and tones of low-brightness areas are not expressed because of the deterioration of the lamp. Thus, even in the case where the estimation unit 24 determines that the lamp needs to be replaced, this issue may also be handled by correcting tone characteristics of low-brightness areas. Specifically, the values of image data for low-brightness areas are increased so as to retain the tone characteristics of the low-brightness areas.

The conversion-relationship generation unit 25 generates a one-dimensional look up table (LUT) as conversion relationships used to correct tone characteristics.

Here, the above-described evaluation image G is used. In addition, here, it is preferable that low-brightness colors be used for the first evaluation color H1 and the second evaluation color H2 in order to correct tone characteristics of low-brightness areas.

For example, in the case where the lamp is not deteriorated, suppose that when the brightness of the first evaluation color H1 looks the same as the brightness of the second evaluation color H2, the tone values of the first evaluation color H1 are 32 ((R, G, B)=(32, 32, 32)), and the tone values of the second evaluation color H2 are 62 ((R, G, B)=(62, 62, 62)).

After the lamp has been deteriorated, suppose that when the brightness of the first evaluation color H1 looks the same as the brightness of the second evaluation color H2, the tone values of the first evaluation color H1 are 32 ((R, G, B)=(32, 32, 32)), and the tone values of the second evaluation color H2 are 75 ((R, G, B)=(75, 75, 75)). Here, for example, the first evaluation color H1 is not changed and the second evaluation color H2 is changed.

In this case, the conversion-relationship generation unit 25 generates a one-dimensional LUT with which the tone values of image data become 75 from 62.

FIG. 7 is a diagram illustrating a one-dimensional LUT generated by the conversion-relationship generation unit 25.

FIG. 7 illustrates a one-dimensional LUT with which tone values illustrated as input values are corrected to tone values illustrated as output values. As illustrated in FIG. 7, when an input value is 62, an output value is 75. For other input values, correction is also performed with the one-dimensional LUT such that smooth tone characteristics are obtained.

The tone correction unit 26 corrects the tone characteristics of the image data to be output by the image-data output unit 22, using the one-dimensional LUT generated by the conversion-relationship generation unit 25. In this manner, the tone correction unit 26 corrects the tone characteristics of the image data to be output by the image-data output unit 22, using conversion relationships generated in accordance with the first evaluation color H1 and the second evaluation color H2 obtained when the brightness of the first evaluation color H1 looks the same as the brightness of the second evaluation color H2.

As a result, even when the lamp is deteriorated, an issue tends not to occur in that tones of low-brightness areas may not be expressed.

Note that the evaluation image G is not limited to the one illustrated in FIG. 5.

Figure 8:
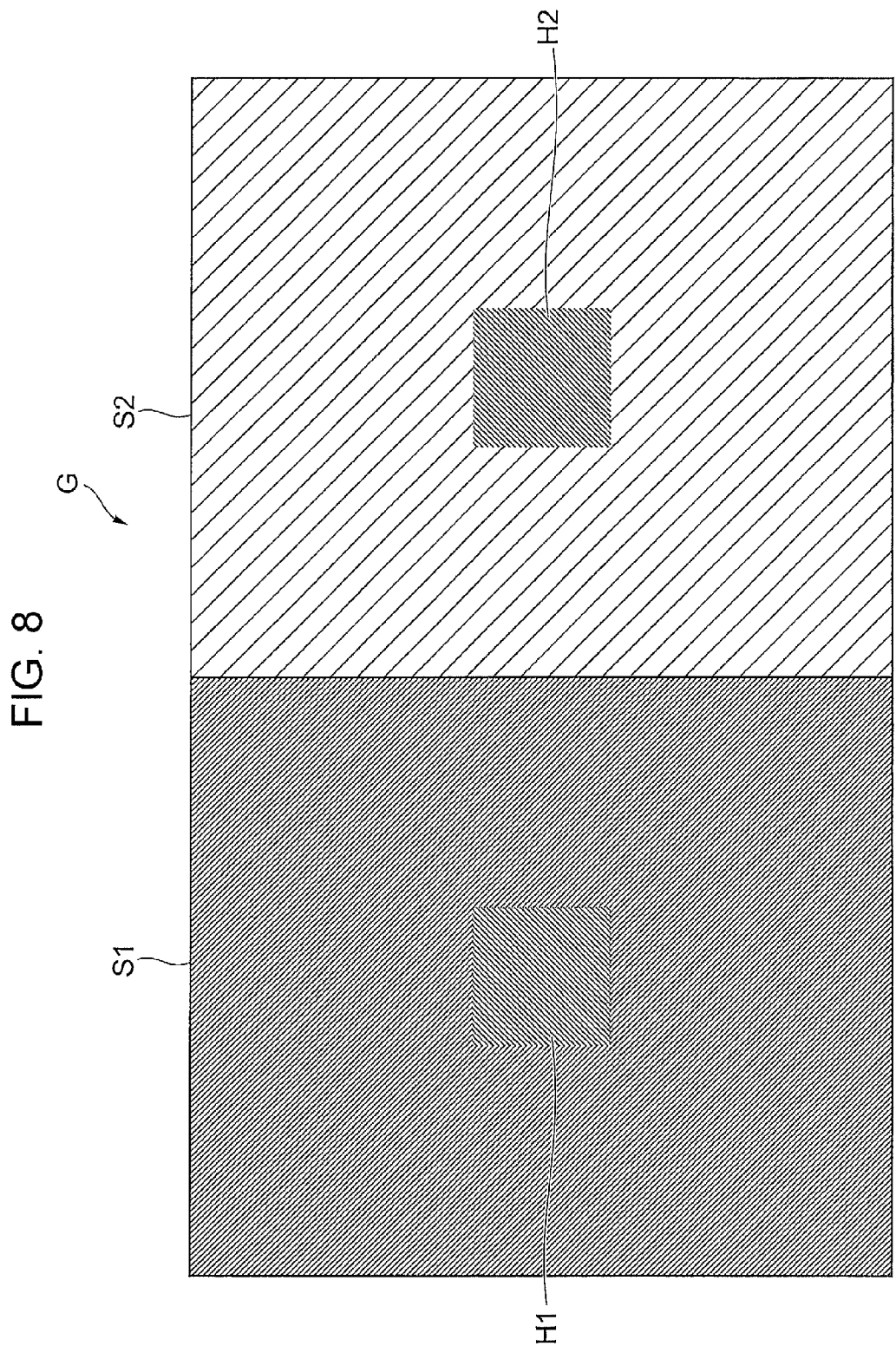
FIG. 8 is a diagram illustrating a second example of the evaluation image displayed by the projector.

FIG. 8 is a diagram illustrating a second example of the evaluation image displayed by the projector 10.

Compared with the evaluation image G illustrated in FIG. 5, the first reference color S1 and the second reference color S2 are changed in the evaluation image G illustrated in FIG. 8. In this case, the image data of the first reference color S1 is, for example, (R, G, B)=(10, 10, 10), and the first reference color S1 is gray. The image data of the second reference color S2 is, for example, (R, G, B)=(248, 248, 248), and the second reference color S2 is gray. The difference between the first reference color S1 and the first evaluation color H1 should be visually observable. Likewise, the difference between the second reference color S2 and the second evaluation color H2 should be visually observable. In this case, the differences are clear, and the image in FIG. 8 may be used as the evaluation image G similarly to as in FIG. 5.

In the above-described example, for the evaluation image G, attention is given to the brightness (luminance) of the first evaluation color H1 and the brightness (luminance) of the second evaluation color H2, and whether or not the brightness of the first evaluation color H1 is the same as the brightness of the second evaluation color H2 is evaluated. However, the way in which an evaluation is performed is not limited to this. For example, since images tend to be colored when the lamp is deteriorated, the degree of deterioration of the lamp may be evaluated in accordance with the tint of an image. In this case, the degree of deterioration of the lamp of the projector 10 is evaluated in accordance not with the brightness of the lamp but with the tint of the lamp. Specifically, attention is given to the tint of the first evaluation color H1 and the tint of the second evaluation color H2, and whether the tint of the first evaluation color H1 looks the same as the tint of the second evaluation color H2 is evaluated.

Figure 9:
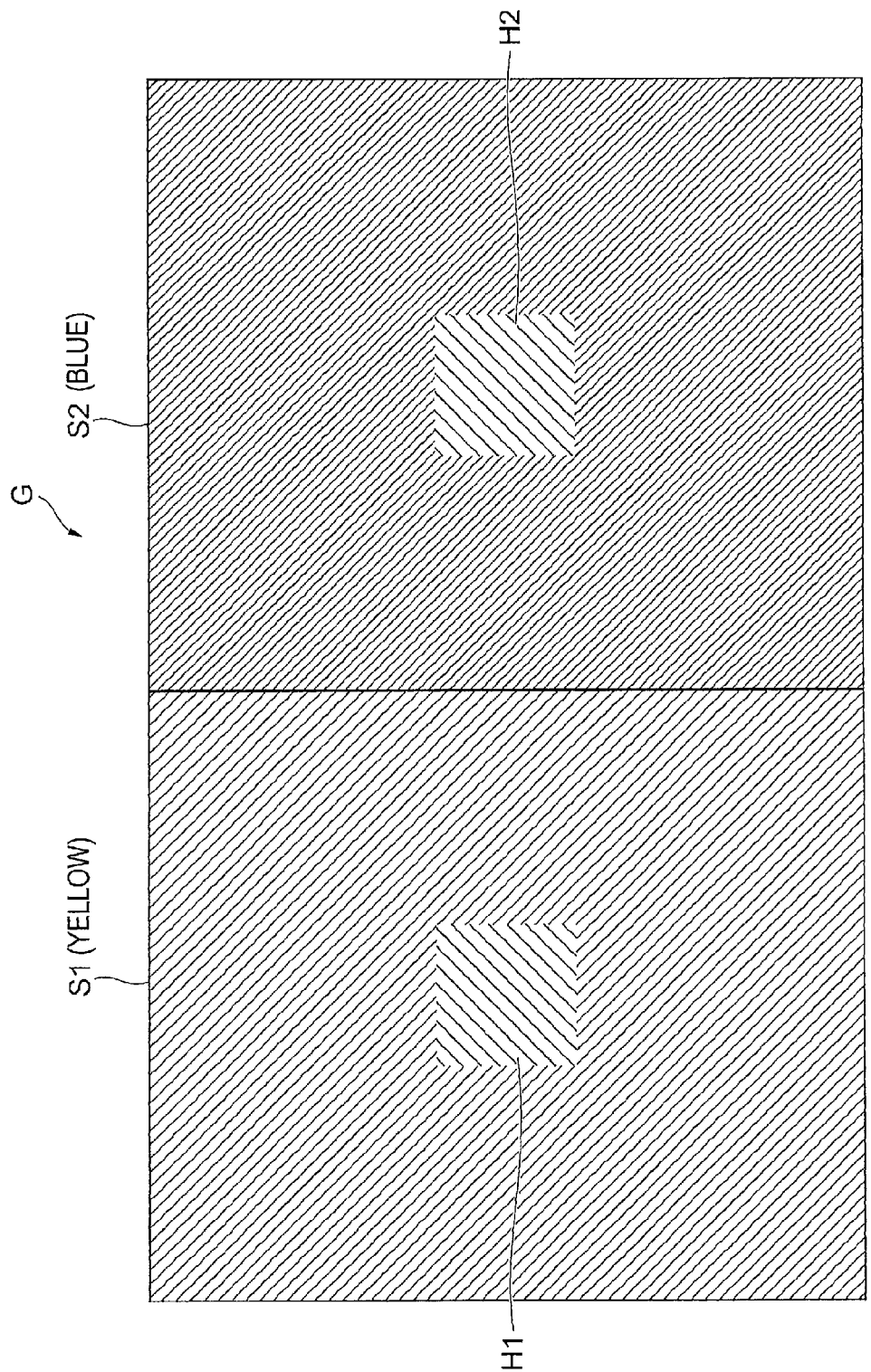
FIG. 9 is a diagram illustrating a third example of the evaluation image displayed by the projector.

FIG. 9 is a diagram illustrating a third example of the evaluation image displayed by the projector 10.

The evaluation image G illustrated in FIG. 9 is an image used to evaluate the degree of deterioration of the lamp of the projector 10 in terms of tint. Compared with the evaluation image G illustrated in FIG. 5, the first reference color S1 and the second reference color S2 are changed in the evaluation image G illustrated in FIG. 9. The image data of the first reference color S1 is (R, G, B)=(255, 255, 0), and the first reference color S1 is yellow. The image data of the second reference color S2 is (R, G, B)=(0, 0, 255), and the second reference color S2 is blue. In this case, it is preferable that the hue of the first reference color S1 be significantly different from the hue of the second reference color S2. For example, complementary colors are used. Then, whether the tint of the first evaluation color H1 looks the same as the tint of the second evaluation color H2 is evaluated.

In the above-described example, the number of images having the first evaluation color H1 is one and the number of images having the second evaluation color H2 is one; however, the number of images is not limited to this.

Figure 10:
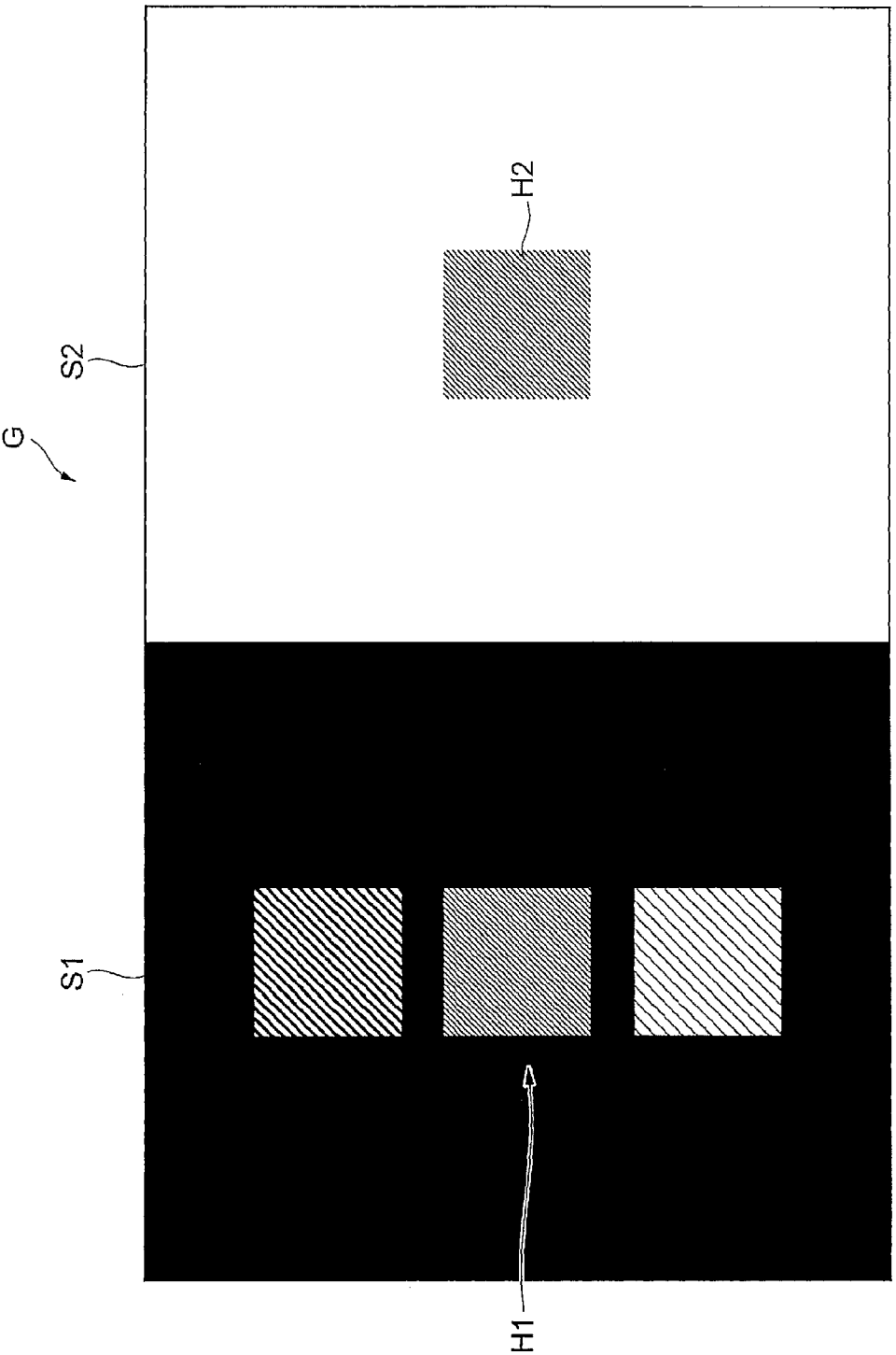
FIG. 10 is a diagram illustrating a fourth example of the evaluation image displayed by the projector.

FIG. 10 is a diagram illustrating a fourth example of the evaluation image displayed by the projector 10.

Compared with the evaluation image G illustrated in FIG. 5, the number of images having the first evaluation color H1 is changed to a certain number greater than one (three in the example of FIG. 10) in the evaluation image G illustrated in FIG. 10. The images having the first evaluation color H1 are different from each other in terms of brightness. Then, the user selects an image whose brightness is the same as the brightness of the image having the second evaluation color H2 from among the plural images having the first evaluation color H1. Note that the number of images having the second evaluation color H2 may also be a certain number greater than one. In addition, even in the case where the number of images having the first evaluation color H1 is changed to a certain number greater than one, and the number of images having the second evaluation color H2 is changed to a certain number greater than one, the images do not have to be displayed simultaneously.

In the above-described example, the shape of the image having the first evaluation color H1 is a rectangular shape and the shape of the image having the second evaluation color H2 is a rectangular shape; however, shapes are not limited to this.

Figure 11:
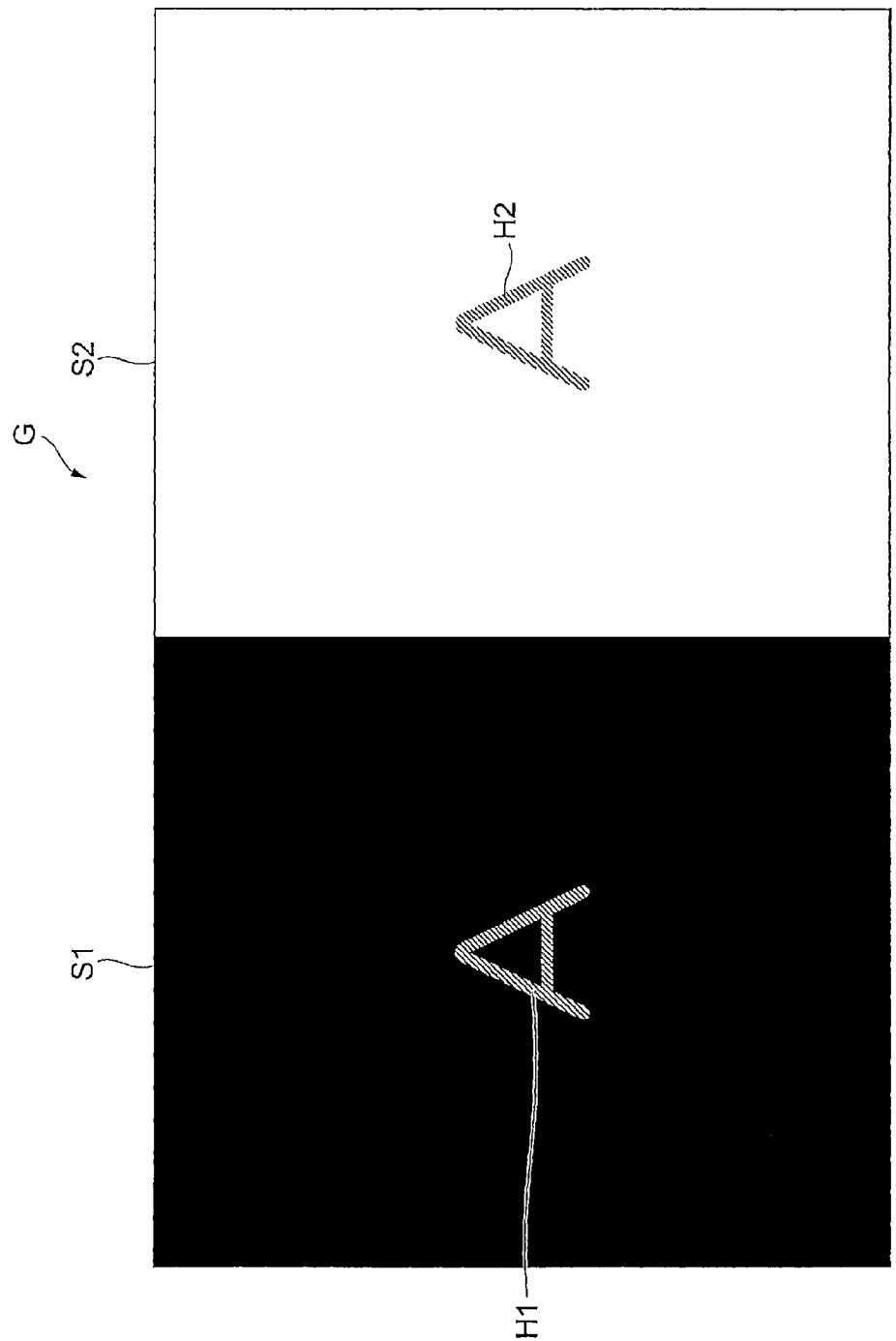
FIG. 11 is a diagram illustrating a fifth example of the evaluation image displayed by the projector.

FIG. 11 is a diagram illustrating a fifth example of the evaluation image displayed by the projector 10.

Compared with the evaluation image G illustrated in FIG. 5, the shape of the image having the first evaluation color H1 and the shape of the image having the second evaluation color H2 are changed to the shape of "A" in the evaluation image G illustrated in FIG. 11. Note that it is preferable that the shape of the image having the first evaluation color H1 be the same as the shape of the image having the second evaluation color H2.

Furthermore, the shape of the image having the first reference color S1 and the shape of the image having the second reference color S2 may also be changed.

Figure 12:
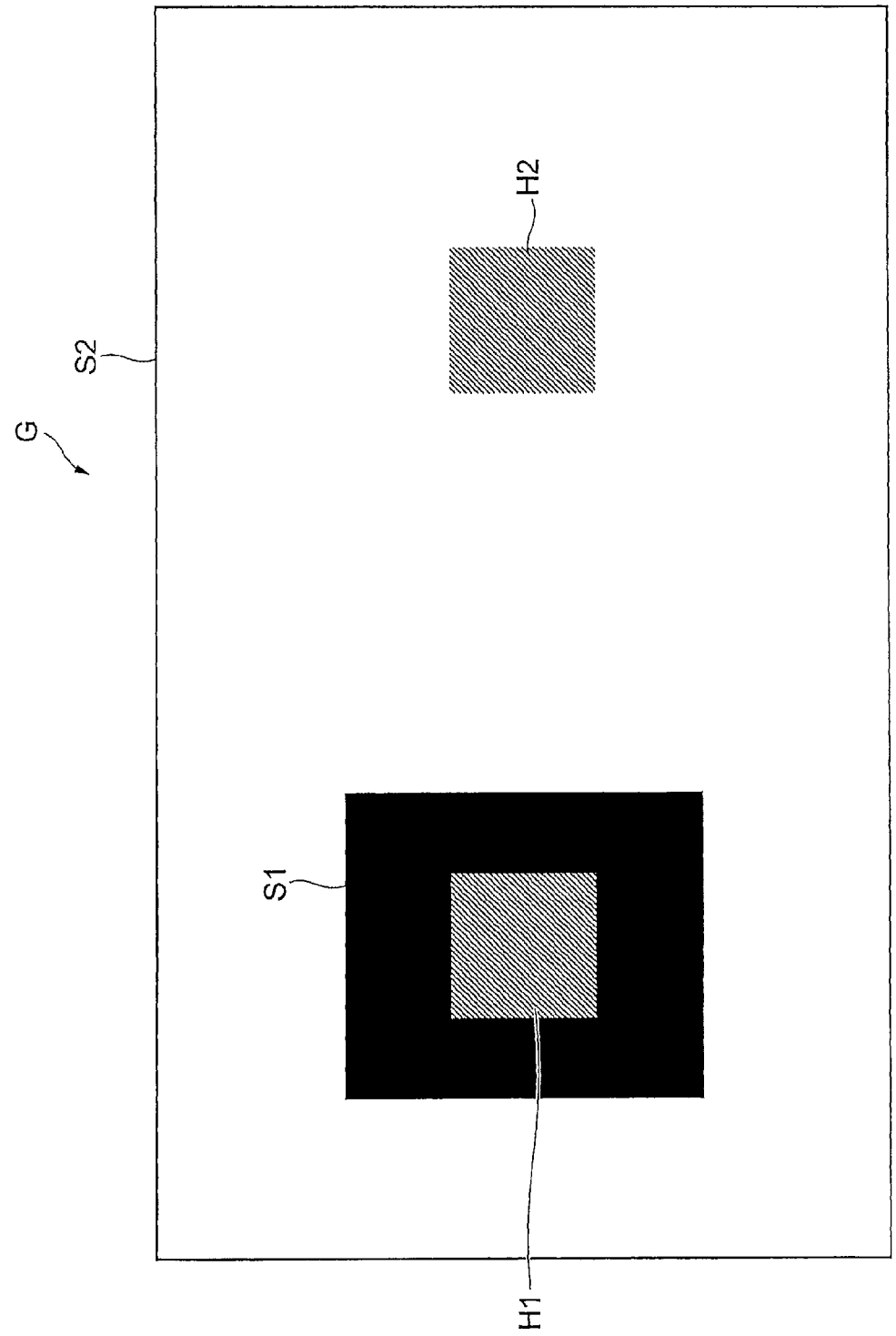
FIG. 12 is a diagram illustrating a sixth example of the evaluation image displayed by the projector.

FIG. 12 is a diagram illustrating a sixth example of the evaluation image displayed by the projector 10.

The area of the image having the first reference color S1 is smaller and the area of the image having the second reference color S2 is larger in the evaluation image G illustrated in FIG. 12 than in the evaluation image G illustrated in FIG. 5. Note that, it is preferable that the area of the image having the first evaluation color H1 be the same as the area of the image having the second evaluation color H2.

<Description of Operation of Evaluation System 1>

Next, an operation of the image generation apparatus 20 will be described.

Figure 13:
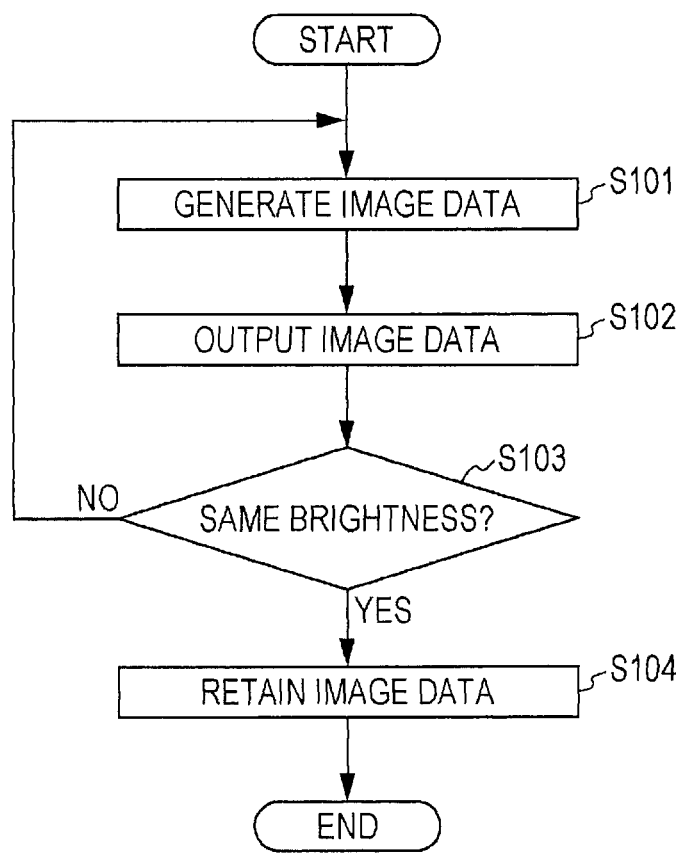
FIG. 13 is a flowchart illustrating an operation of the evaluation system.
Figure 14:
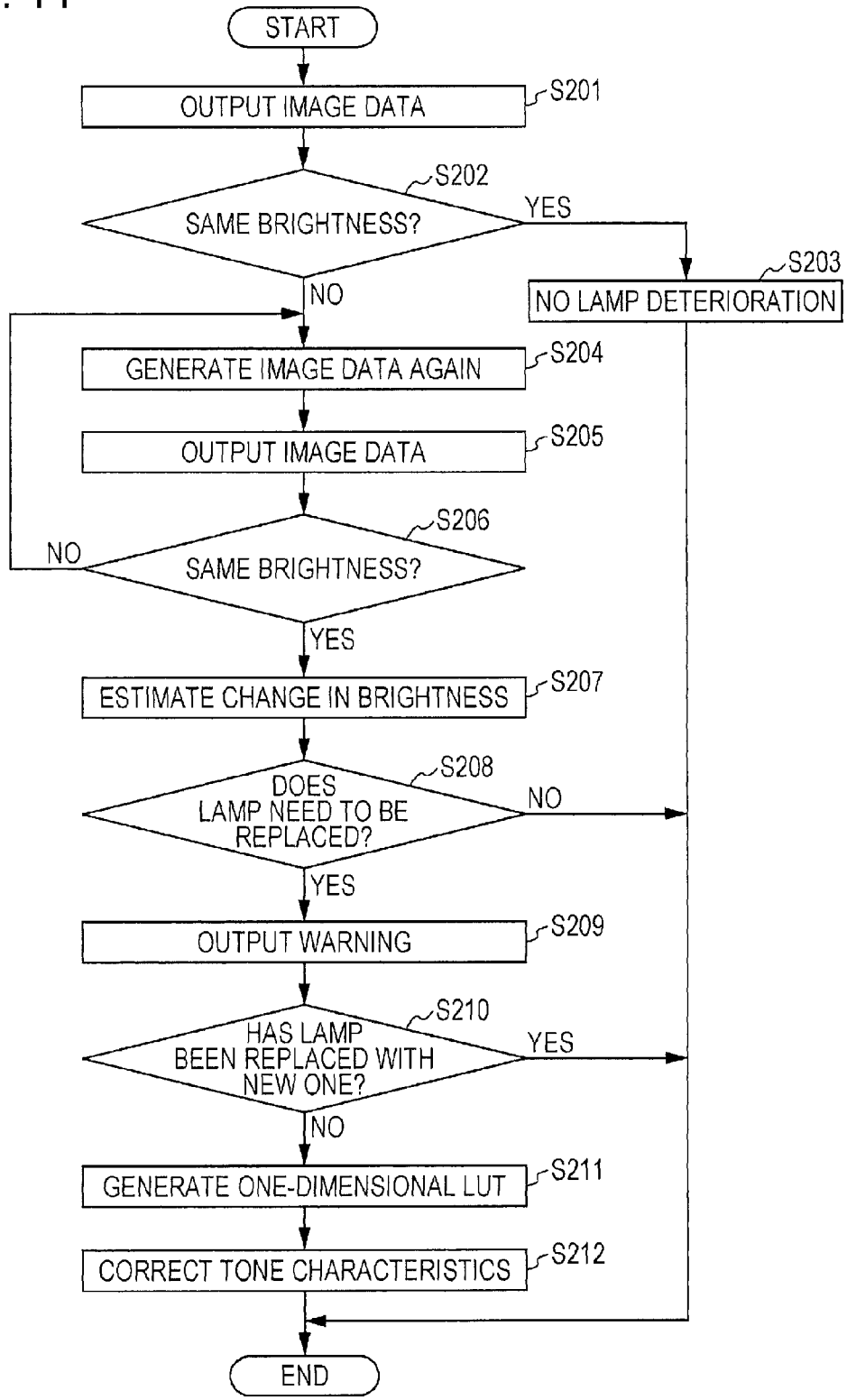
FIG. 14 is a flowchart illustrating an operation of the evaluation system.

FIGS. 13 and 14 are flowcharts describing an operation of the evaluation system 1.

In the following, the operation of the evaluation system 1 will be described mainly using FIGS. 2, 13, and 14.

First, in a state in which the lamp of the projector 10 is not deteriorated, the image-data generation unit 21 generates image data of the evaluation image G described using, for example, FIG. 5 (step 101).

Next, the image-data output unit 22 outputs the image data of the evaluation image G to the projector 10 (step 102). The evaluation image G is displayed by the projector 10 on the screen 30.

The user compares an image having the first evaluation color H1 with an image having the second evaluation color H2, and determines whether or not the brightness of the image having the first evaluation color H1 is the same as the brightness of the image having the second evaluation color H2 (step 103).

In the case where the brightness of the image having the first evaluation color H1 is not the same as the brightness of the image having the second evaluation color H2 (No in step 103), the process returns to step 101. Then, the image-data generation unit 21 changes either the brightness of the first evaluation color H1 or the brightness of the second evaluation color H2, and generates image data of the evaluation image G.

In contrast, in the case where the brightness of the image having the first evaluation color H1 is the same as the brightness of the image having the second evaluation color H2 (Yes in step 103), the retaining unit 23 retains the image data of the first evaluation color H1 and the image data of the second evaluation color H2 (step 104).

Then, after the projector 10 has been used for a predetermined period, the image-data output unit 22 outputs the image data of the evaluation image G to the projector 10 again (step 201). Note that, here, the image data retained in the retaining unit 23 is used as the image data of the first evaluation color H1 and the image data of the second evaluation color H2. The evaluation image G is displayed by the projector 10 on the screen 30.

The user compares the image having the first evaluation color H1 with the image having the second evaluation color H2, and determines whether or not the brightness of the image having the first evaluation color H1 is the same as the brightness of the image having the second evaluation color H2 (step 202).

In the case where the brightness of the image having the first evaluation color H1 is the same as the brightness of the image having the second evaluation color H2 (Yes in step 202), the estimation unit 24 determines that the lamp is not deteriorated (step 203), and ends the process.

In contrast, in the case where the brightness of the image having the first evaluation color H1 is not the same as the brightness of the image having the second evaluation color. H2 (No in step 202), the image-data generation unit 21 changes either the brightness of the first evaluation color H1 or the brightness of the second evaluation color H2, and generates image data of the evaluation image G again (step 204). Then, the image-data output unit 22 outputs the image data of the evaluation image G to the projector 10 (step 205).

The user compares the image having the first evaluation color H1 with the image having the second evaluation color H2, and determines whether or not the brightness of the image having the first evaluation color H1 is the same as the brightness of the image having the second evaluation color H2 (step 206).

In the case where the brightness of the image having the first evaluation color H1 is not the same as the brightness of the image having the second evaluation color H2 (No in step 206), the process returns to step 204. Then, either the brightness of the first evaluation color H1 or the brightness of the second evaluation color H2 is changed, and image data of the evaluation image G is generated.

In contrast, in the case where the brightness of the image having the first evaluation color H1 is the same as the brightness of the image having the second evaluation color H2 (Yes in step 206), the estimation unit 24 estimates a change in the brightness of the lamp of the projector 10 from the image data of the first evaluation color H1 and the image data of the second evaluation color H2 in the evaluation image G (step 207).

Furthermore, the estimation unit 24 determines whether or not the lamp needs to be replaced from the estimated change in brightness (step 208).

In the case where the estimation unit 24 determines that the lamp does not need to be replaced (No in step 208), the process ends.

In contrast, in the case where the estimation unit 24 determines that the lamp needs to be replaced (Yes in step 208), the image-data output unit 22 outputs a warning message for the user to the projector 10 (step 209).

As a result, in the case where the user has replaced the lamp with a new one (Yes in step 210), the process ends.

In contrast, in the case where the user does not replace the lamp with a new one (No in step 210), the conversion-relationship generation unit 25 generates a one-dimensional LUT like the one described using FIG. 7 (step 211). Then, the tone correction unit 26 corrects tone characteristics of the image data (step 212). As a result, image data whose tone characteristics of low-brightness areas have been improved is output from the image-data output unit 22.

Note that, the projector 10 used in steps 101 to 104 of FIG. 13 is also used in steps 201 to 212 of FIG. 14 in the evaluation system 1 described above; however, plural projectors 10 may also be used. For example, a certain projector 10, which is a master projector, performs processing in steps 101 to 104, and the image data of the first evaluation color H1 and the image data of the second evaluation color H2 retained in the retaining unit 23 are applied to another projector 10, which is an evaluation target, and the other projector 10 may perform processing in steps 201 to 212.

In addition, in the evaluation system 1 described above, a change in the brightness or tint of the lamp is evaluated; however, an evaluation may also be performed using a color temperature. For example, the evaluation image G illustrated in FIG. 9 is used, and in the case where the first evaluation color H1 looks bluer than the second evaluation color H2, it may be determined that the brightness and color temperature of the lamp are reduced.

Furthermore, the evaluation system 1 described above is used to determine whether or not the lamp of the projector 10 has been deteriorated; however, the evaluation system 1 may also be used for other purposes. For example, the evaluation system 1 may also be used to determine whether or not the backlight of a liquid crystal display has been deteriorated or whether or not a cathode-ray tube has been deteriorated.

<Description of Program>

As described above, the process performed by the image generation apparatus 20 in the present exemplary embodiment described above may be realized by, for example, a program such as an application software program.

Thus, the process performed by the image generation apparatus 20 may also be considered to be a program realizing an image-data generation function through which image data of an evaluation image having a first reference color, a second reference color, a first evaluation color, and a second evaluation color is generated, the first reference color and the second reference color being determined using a relationship in which the first reference color and the second reference color are paired in a predetermined color space, the first evaluation color and the second evaluation color being colors between the first reference color and the second reference color in the predetermined color space, the first evaluation color being determined with respect to the first reference color, the second evaluation color being determined with respect to the second reference color and being different from the first evaluation color, an image-data output function through which the image data is output to a display device that causes the evaluation image to be displayed, and a retaining function through which image data of the first evaluation color and image data of the second evaluation color obtained when an image having the first evaluation color looks the same as an image having the second evaluation color in terms of brightness or tint in a case where the evaluation image is displayed on the display device are retained.

Note that the program that realizes the present exemplary embodiment may be, as a matter of course, provided using a communication unit, and also be recorded in a recording medium such as a CD-ROM and provided.

The present exemplary embodiment has been described above, and the technical scope of the invention is not limited to the scope of the above-described exemplary embodiment. It is apparent from the following claims that embodiments obtained by adding various changes and modifications to the above-described exemplary embodiment also fall within the technical scope of the invention.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image generation apparatus comprising:
a memory; and
a processor programmed to
    generate image data of an evaluation image having a first reference color, a second reference color, a first evaluation color, and a second evaluation color, the first reference color and the second reference color being determined using a relationship in which the first reference color and the second reference color are paired in a predetermined color space, the first evaluation color and the second evaluation color being colors defined between the first reference color and the second reference color in the predetermined color space relative to a color gamut, the first evaluation color being determined with respect to the first reference color, the second evaluation color being determined with respect to the second reference color, the first and second reference colors being closer than the first and second evaluation colors to outer edges of the color gamut, the evaluation image being generated by selecting four different colors for the first reference color, the second reference color, the first evaluation color, and the second evaluation color, the evaluation image being formed such that the first evaluation color is positioned inside the first reference color and not inside the second reference color and such that the second evaluation color is positioned inside the second reference color and not inside the first reference color, an image having the first evaluation color being surrounded by and in contact with an image having the first reference color, and an image having the second evaluation color being surrounded by and in contact with an image having the second reference color;
    output the image data to a display device that is caused to display the evaluation image, the display device having a lamp that displays the entire evaluation image;
    adjust at least one of the first and second evaluation colors until the image having the first evaluation color looks the same as the image having the second evaluation color in terms of brightness or tint in a case where the evaluation image is displayed on the display device;
    retain image data of the first evaluation color and image data of the second evaluation color of the evaluation image obtained when the image having the first evaluation color looks the same as the image having the second evaluation color in terms of brightness or tint in the displayed evaluation image;
    stop display of the evaluation image;
    re-display the same evaluation image including the retained image data of the first evaluation color and the retained image data of the second evaluation color after the display device has been used for a predetermined period; and
    determine whether the lamp of the display device has deteriorated based on whether the image having the first evaluation color still looks the same as the image having the second evaluation color in terms of brightness or tint in the re-displayed evaluation image.

2. The image generation apparatus according to claim 1, wherein
    the processor is further programmed to correct tone characteristics of the image data to be output, using a conversion relationship generated in accordance with the first evaluation color and the second evaluation color obtained when the image having the first evaluation color looks the same as the image having the second evaluation color in terms of brightness or tint.

3. An evaluation system comprising:
a memory;
a processor programmed to generate image data of an evaluation image; and
a display device that is caused to display the evaluation image in accordance with the image data, wherein
the processor is programmed to
generate image data of an evaluation image having a first reference color, a second reference color, a first evaluation color, and a second evaluation color, the first reference color and the second reference color being determined using a relationship in which the first reference color and the second reference color are paired in a predetermined color space, the first evaluation color and the second evaluation color being colors defined between the first reference color and the second reference color in the predetermined color space relative to a color gamut, the first evaluation color being determined with respect to the first reference color, the second evaluation color being determined with respect to the second reference color, the first and second reference colors being closer than the first and second evaluation colors to outer edges of the color gamut, the evaluation image being generated by selecting four different colors for the first reference color, the second reference color, the first evaluation color, and the second evaluation color, the evaluation image being formed such that the first evaluation color is positioned inside the first reference color and not inside the second reference color and such that the second evaluation color is positioned inside the second reference color and not inside the first reference color, an image having the first evaluation color being surrounded by and in contact with an image having the first reference color, and an image having the second evaluation color being surrounded by and in contact with an image having the second reference color,
    output the image data to the display device that is caused to display the evaluation image, the display device having a lamp that displays the entire evaluation image,
    adjust at least one of the first and second evaluation colors until the image having the first evaluation color looks the same as the image having the second evaluation color in terms of brightness or tint in a case where the evaluation image is displayed on the display device,
    retain image data of the first evaluation color and image data of the second evaluation color of the evaluation image obtained when the image having the first evaluation color looks the same as the image having the second evaluation color in terms of brightness or tint in the displayed evaluation image,
    stop display of the evaluation image,
    re-display the same evaluation image including the retained image data of the first evaluation color and the retained image data of the second evaluation color after the display device has been used for a predetermined period, and determine whether the lamp of the display device has deteriorated based on whether the image having the first evaluation color still looks the same as the image having the second evaluation color in terms of brightness or tint in the re-displayed evaluation image.

4. A non-transitory computer readable medium storing a program causing a computer to execute a process, the process comprising:

generating image data of an evaluation image having a first reference color, a second reference color, a first evaluation color, and a second evaluation color, the first reference color and the second reference color being determined using a relationship in which the first reference color and the second reference color are paired in a predetermined color space, the first evaluation color and the second evaluation color being colors defined between the first reference color and the second reference color in the predetermined color space relative to a color gamut, the first evaluation color being determined with respect to the first reference color, the second evaluation color being determined with respect to the second reference color, the first and second reference colors being closer than the first and second evaluation colors to outer edges of the color gamut, the generating image data including forming the evaluation image by selecting four different colors for the first reference color, the second reference color, the first evaluation color, and the second evaluation color, the evaluation image being formed such that the first evaluation color is positioned inside the first reference color and not inside the second reference color and such that the second evaluation color is positioned inside the second reference color and not inside the first reference color, an image having the first evaluation color being surrounded by and in contact with an image having the first reference color, and an image having the second evaluation color being surrounded by and in contact with an image having the second reference color;

outputting the image data to a display device that is caused to display the evaluation image, the display device having a lamp that displays the entire evaluation image;

adjusting at least one of the first and second evaluation colors until the image having the first evaluation color looks the same as the image having the second evaluation color in terms of brightness or tint in a case where the evaluation image is displayed on the display device;

retaining image data of the first evaluation color and image data of the second evaluation color of the evaluation image obtained when the image having the first evaluation color looks the same as the image having the second evaluation color in terms of brightness or tint in the displayed evaluation image;

stopping display of the evaluation image;

re-displaying the same evaluation image including the retained image data of the first evaluation color and the retained image data of the second evaluation color after the display device has been used for a predetermined period; and determining whether the lamp of the display device has deteriorated based on whether the image having the first evaluation color still looks the same as the image having the second evaluation color in terms of brightness or tint in the re-displayed evaluation image.

\* \* \* \* \*